Nov. 3, 1964
A. B. PARROTT
3,155,810
WELD CURRENT INDICATOR
Filed July 17, 1962
2 Sheets-Sheet 1
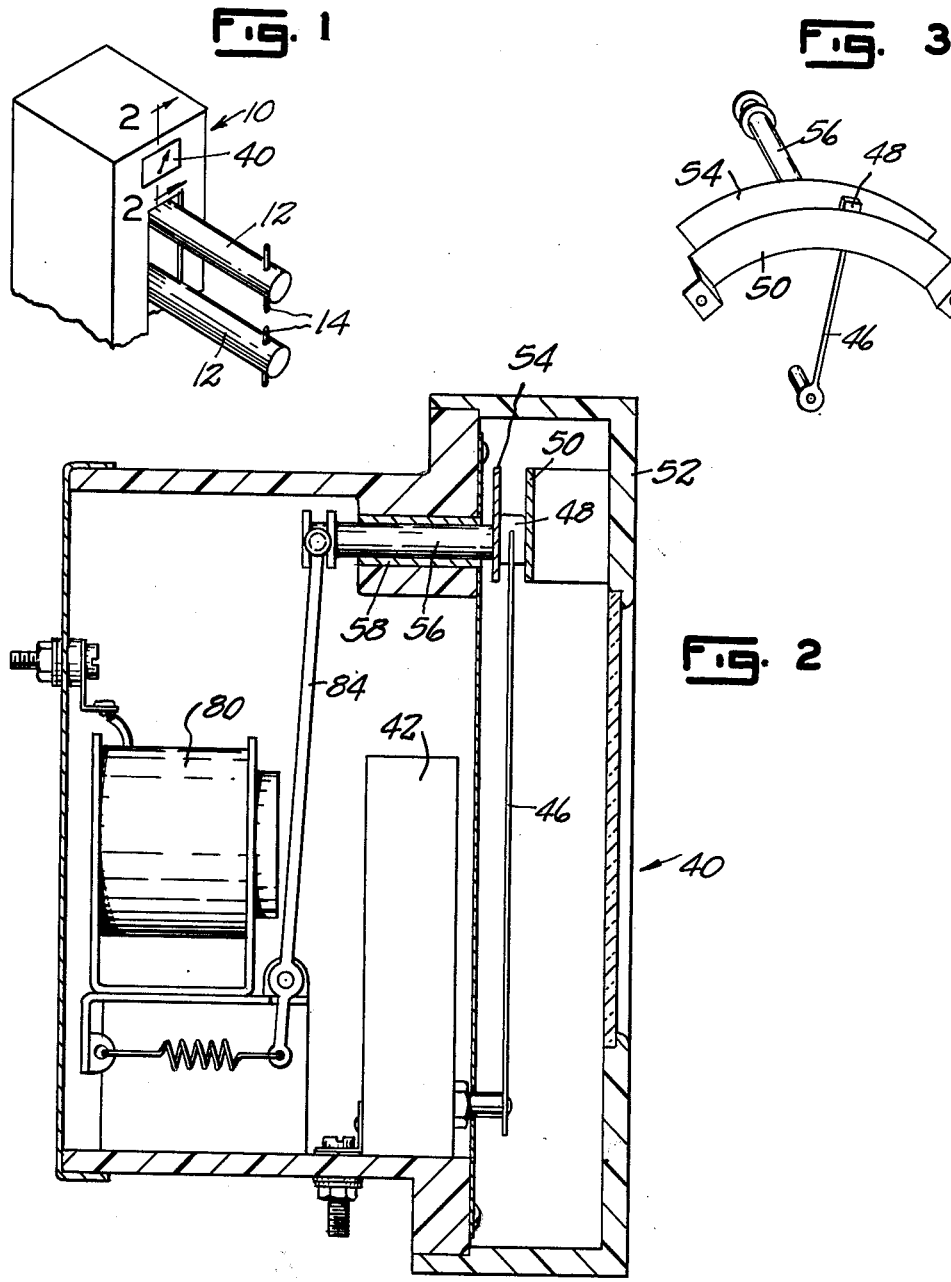
INVENTOR.
ALTON B. PARROTT
BY
Eugene C. Knoblock
ATTORNEY

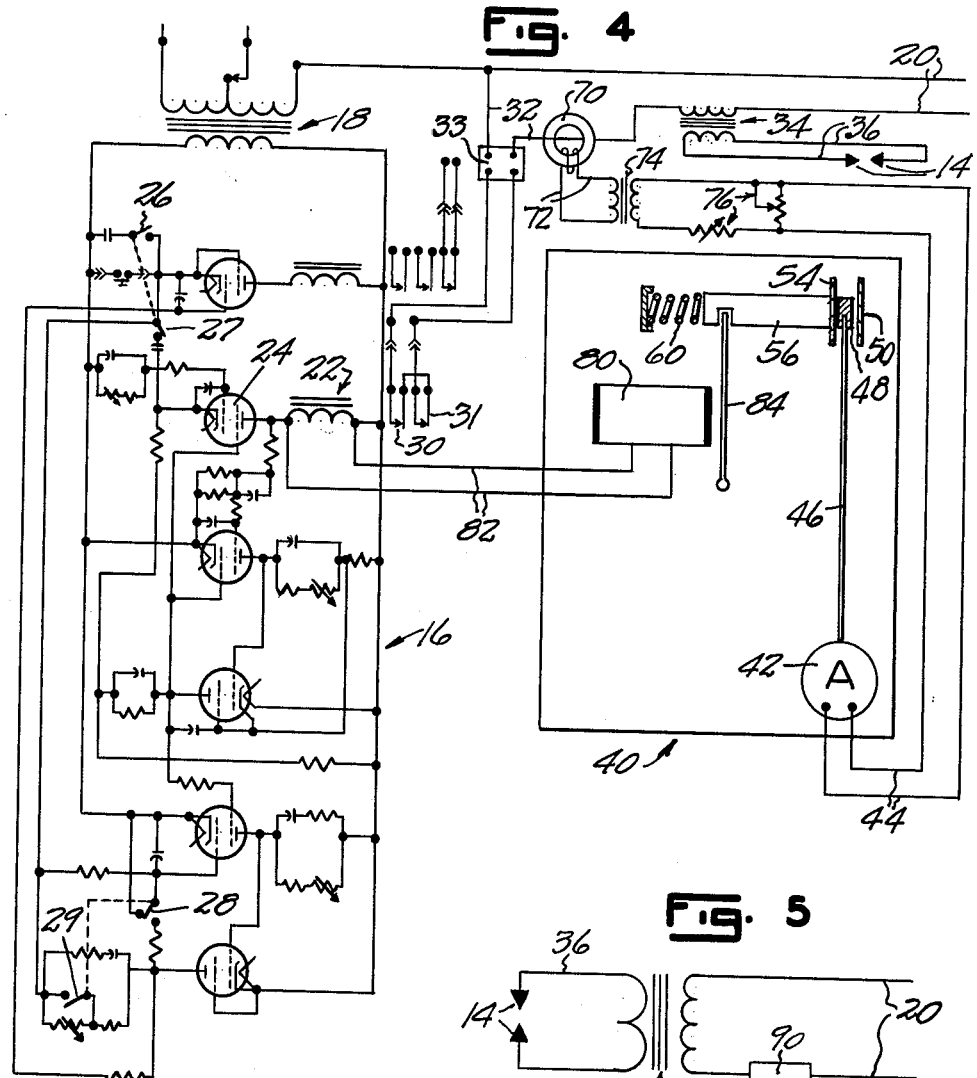

United States Patent Office

3,155,810
Patented Nov. 3, 1964

3,155,810
WELD CURRENT INDICATOR
Alton B. Parrott, 1200 Milton St., Benton Harbor, Mich.
Filed July 17, 1962, Ser. No. 210,415
8 Claims. (Cl. 219—109)

This invention relates to improvements in weld current indicators, and particularly to a device of this character usable with an electric welder.

In the use of electric welders to make a spot weld, a high electric current is passed through the weld area for a very short length of time, which is commonly referred to as "weld time." The optimum weld time and the optimum weld current are interrelated and vary with changes in the type and gauge of metals being welded and other factors. The range of variation of weld time may extend from one-twentieth of a second to one-half second or more. Most spot welding is done with a weld time between one-tenth second and one-fifth second.

The measurement of weld current to ascertain whether optimum weld current is being utilized is difficult if not impossible by the use of conventional ammeters. Such meters have inherent ballistic characteristics which do not allow the pointer of the meter to come up to proper indication during the weld because of the short length of time that the current flows in the welding operation. Furthermore, even if the meter operated with sufficient rapidity to indicate properly on such short pulse of current, it would be very difficult for a person to read the indication during the welding operation and before the pointer of the meter dropped to zero upon completion of the weld.

Efforts to overcome the difficulties of indicating to an operator the value of current which flows through a weld during a short welding pulse have included various electronic approaches. Electronic devices can be made to overcome the ballistic or inertia problems inherent in ammeters, but they introduce other problems. One of the problems encountered in using purely electronic circuits for current measurement is a tendency for such circuits to indicate "instantaneous" values rather than average values or "root-mean-square" values. The root-mean-square value of an alternating current is always less than the maximum value of that current due to the pulsation of the current and is a value which will produce the same amount of work or heat as an equivalent value in direct current. In a spot welder the wave form of the current is very complex and complicates the problem of determining the root-mean-square value thereof.

A moving coil type of ammeter is an integrating type of indicator by nature which always reads root-mean-square values of alternating current, and it is the primary object of this invention to provide an electric welder which may have associated therewith a moving coil ammeter as a means for indicating accurately and conveniently to an operator the value of weld current being utilized.

A further object of the invention is to provide a device of this character wherein an ammeter is utilized to measure weld current and has a pointer or indicator which is mechanically locked or clamped at all times except when a weld is being made, so that current indication by the meter persists after a welding operation has been completed and it is not necessary for the operator to read the meter during the welding operation.

A further object is to provide a device of this character having a weld timer including a solenoid and capable of being preset to automatically time a weld to the length desired, with which relay is associated a clamp actuating solenoid associated with an ammeter to normally lock the ammeter and to release the same during energization of the welding circuit.

A further object is to provide a device of this character having a weld timer for controlling flow of electric current to a welder and to a meter through a current transformer having a predetermined step-down ratio permitting operation of the meter by a low value of current and calibration of the ammeter in terms of welding current and also having associated with the welder electrically actuated clamping mechanism effective to lock the meter indicator when the welder is not energized.

A further object is to provide a device of this character wherein a weld timer utilized to control the time of a weld also controls the functioning of the locking mechanism of an ammeter, and wherein a meter shunt is placed in the main line of the current to the meter so that a small accurate meter may be utilized.

Other objects will be apparent from the following specification.

In the drawings:

FIG. 1 is a fragmentary perspective view of an electric welder provided with my weld current indicator;

FIG. 2 is an enlarged sectional view of a locking type of meter and actuating mechanism therefor;

FIG. 3 is a perspective view of the meter locking mechanism;

FIG. 4 is a schematic view illustrating the arrangement and relationship of the mechanical and electrical parts of the device;

FIG. 5 is a schematic view illustrating a modification of the electrical circuit to a meter;

FIG. 6 is a schematic view illustrating another embodiment of the invention; and FIG. 7 is a schematic view illustrating still another embodiment of the invention.

Referring to the drawings which illustrate the preferred embodiment of the invention, the numeral 10 designates the housing of an electric spot welder having a pair of carriers or horns 12 projecting therefrom. The lower horn 12 is preferably rigid or fixed, and the upper horn 12 is movably mounted to shift toward and from the lower horn. The horns carry welding electrodes 14 adjacent to their outer ends, between which a work piece is introduced to be engaged between the tips of the electrodes with sufficient pressure to perform the welding operation.

The welder is provided with a weld timer of any suitable character capable of being preset to automatically time a weld for the length desired. One such weld timer is illustrated herein schematically at 16 and constitutes an electronic circuit powered by an input transformer 18 connected to an alternating current power line 20. The weld timer includes a relay 22 which closes and remains closed for the duration of the weld as controlled by the timer. This timing feature is a part of the circuit associated with an electron tube 24 and is of conventional character and functions conventionally so that specific reference thereto is not believed necessary. It will be understood that suitable switch means 26, 27, 28 and 29 are provided in the weld timer for controlling the functioning thereof. The relay 22 controls switches 30 and 31 which are closed when the relay 22 is operated and which open when the relay 22 is deenergized. The switches 30 and 31 control means, such as an ignitron tube switch device 33, regulating the flow of current from line 20 through leads 32 to the welding transformer 34 with which the welding electrodes 14 are connected by leads 36.

A weld current indicator 40 is provided which may be mounted at any suitable position, as upon the housing 10, in a location to be easily and conveniently viewed by an operator. The indicator preferably includes or utilizes an ammeter 42 having a coil (not shown) with which electric leads 44 are connected. The ammeter will preferably be an A.C. meter of any suitable type having a pointer 46 which has a tip portion 48 extending adjacent to an arcuate clamper plate 50 fixed to the housing or casing 52 of the meter and concentric with the pivot axis of the pointer 46. The index dial 54 of the meter is shiftable in the meter housing 52 in any suitable manner and preferably is pivoted at the bottom thereof at a level adjacent the pivot axis of the pointer 46 and is free at its top and normally has clearance with the pointer tip 48, as illustrated in FIG. 4, so that the pointer tip may move relative thereto so as to accommodate indication of current value by observation of the position of the pointer relative to the dial plate. A plunger 56 is connected to the free portion of the dial plate 54 and is shiftably carried by the plunger housing 52 as by slidable mounting thereof endwise in a bushing 58. At its rear end the plunger 56 is acted upon by a spring 60 which normally urges the plunger to a selected position. That selected position may be either clear of the dial pointer or in contact with the dial pointer. For the purposes of this device, it is preferred that the normal spring urged position of the plunger 56 will be such as to press the dial plate 54 against the pointer tip 48 so as to clamp that pointer tip 48 against the stationary plate 50 so that the pointer 46 is normally held inoperative by a positive mechanical clutch arrangement.

Because the primary welder current is high, for example, in the order of from 50 to 500 amperes, it is not practical with an inexpensive and accurate ammeter to measure the welding current directly. Consequently, as illustrated in FIG. 4, a current transformer 70 may be provided to effect connection between the line 20 or the circuit 36 and the coil of the ammeter 42. This current transformer 70 may have a step-down ratio in the order of 100 to one or greater. The current transformer will be so designed that its output at leads 72 will be much less than the line current, but it will be proportional to the line current. In some instances, as illustrated in FIG. 4, if the output of the current transformer 70 exceeds the capacity of a particular meter 42, a second and matching transformer 74 may be provided to further reduce the current fed to the ammeter 42 by leads 44 to which the transformer 74 is connected. It will be understood that such a matching transformer 74 is optional.

The ammeter selected may require provision of two or more scales depending upon the range of currents to be measured. In cases where multiple scale meters are employed, a switching arrangement 76 utilizing variable resistors may be provided to permit selection of the particular scale or current range of the meter to be utilized. This switching arrangement will be so arranged that the number of positions thereof will correspond to the number of different scales of the meter and will be so correlated to the various scales that accurate functioning of the meter on each of the scales will be provided.

A solenoid is mounted in the meter casing and preferably includes a coil 80 connected by leads 82 with the timer circuit, as at opposite ends of the coil of the relay 22, so that energization of the relay coil 22 simultaneously energizes the solenoid coil. The solenoid includes an actuator arm 84 suitably pivoted with respect to the coil 80 and having connection with the plunger 56 so that energization of the solenoid coil will swing the arm 84 and move the plunger 56 coincident with the start of the welding operation. Thus, assuming that the dial plate 54 and the pointer 46 of the ammeter are so correlated to the plunger 56 and the spring 60 that the pointer 46 is normally held clamped or clutched in stationary position when the solenoid 80 is deenergized, it will be apparent that the energization of the solenoid will shift the plunger 56 to free or release the ammeter pointer 46 during the welding operation and at a time when current from leads 44 is fed to the ammeter coil 42 to energize the ammeter. It will be understood that the solenoid arm 84 will be subjected to spring pressure such as the pressure of spring 60 or of other spring means (not shown) which will instantaneously swing it with the plunger 56 to normal clutching position when the solenoid coil 80 is deenergized.

It will be apparent that in the operation of the welder concurrent operation of the ammeter is permitted but the clamping mechanism is so correlated to the meter that the meter pointer or indicator is locked between successive actuations of the meter. Thus, bearing in mind that weld time may be as little as one-twentieth of a second and seldom is much longer than one-half of a second, it will be evident that the short length of time of the welding operation is insufficient to permit the pointer of an ammeter to reach proper indicating position in most individual operations, due to the inherent ballistic characteristics of the meter. The present device compensates for the ballistics of the meter by allowing the pointer of the meter to "step up" to a true indication of welding current after several welds have been made. Of course, if the ballistics of the meter are such that the time required for the indicator of the meter to reach full scale after current is applied is equal to or less than the weld time desired, the meter will come up to full scale reading on the first weld and the pointer clamp will hold this reading so that it can be observed by the operator. If the next weld is then of approximately the same duration as the first weld, the meter indicator or pointer will not move upon the succeeding meter actuation and welding operation.

In a case where weld time is shorter than the time required for a meter to come to a full scale reading during a single weld operation, the device works equally effectively. Thus, assume that weld time is one-quarter second and that the meter requires one-half second for full scale deflection. In such a case, upon the making of a first weld, the meter indicator will come up about half scale and, upon termination of the weld, the meter indicator will be clamped at a position on the scale less than a full scale reading and hence will not be properly indicative of welding current utilized on the first weld. When the next weld is made entailing a second operation of the meter, the pointer moves up to or at least toward full scale, and in the assumption made above, the reading of the pointer after the second weld should be substantially an accurate reading of welding current. It will be apparent, therefore, that as changes in the length of weld time are made, the number of weld pulses required to bring the meter indicator to a proper indication vary. In other words, the shorter the weld time, the more weld pulses are required to bring the pointer of the meter to proper indication. However, in all instances, after only a few welding operations have been performed, the operator does have an accurate indication upon the meter of the weld current utilized and is able to check the setting of the welder to ascertain if optimum welding conditions are being practiced. As mentioned previously, even though the full welding current does not pass through the meter, the meter can be calibrated in terms of actual welding current utilized because of the proportionality of its supply to the line or welding current made possible through the use of proportional stepped down transformers. A wide range of indication can thus be obtained, particularly with meters having multiple scales. Devices of this character make it possible to indicate welding currents in the full range thereof, such as currents having a value as low as 2,000 amperes and high as 30,000 amperes.

While the use of a current transformer, as illustrated in FIG. 4, accomplishes the results desired, it is possible to substitute a shunt in the power line for a current transformer and thereby achieve desired operation of the device. FIG. 5 illustrates a circuit wherein a shunt member 90 is mounted in the main current supply line, such as in line 20, which feeds the welding circuit 36 through the transformer 34. The shunt has a resistance proportioned to permit only a small portion of line current to pass to meter 42 through leads 44 tapped at terminals 92 of the shunt. As an example, if the resistance of the shunt 90 is 1/100 that of the meter, only 1/100 of total line current will pass through leads 44 to the meter 42.

Another arrangement entailing the use of a shunt is illustrated in FIG. 6 wherein the shunt is connected in the welding circuit 36 at 94 and its terminals 96 have leads 44 extending to the meter 42 connected therewith.

FIG. 7 illustrates another arrangement for providing operating current to the meter 42 and utilizes an inductive pick-up 98 associated with the welding circuit 36 for supplying current to the leads 44 of the meter 42.

In each of the forms illustrated in FIGS. 5, 6 and 7, it will be understood that the meter will be of the type having mechanism for clamping the indicator thereof when the welder is inoperative and having clamp-releasing means correlated with the weld timing mechanism or means to permit operation of the meter when the welder is operating or energized.

While the preferred embodiments of the invention have been illustrated and described, it will be understood that changes in the construction may be made within the scope of the appended claims without departing from the spirit of the invention.

I claim:

1. An electric welder comprising
welding electrodes,
electric current supply means,
a weld timer controlling the duration of supply of electric current from said supply means to said electrodes,
an ammeter having a shiftable pointer and responsive to current flow in said supply means,
means normally mechanically clamping said pointer against movement, and
clamp release means controlled by said weld timer and operated simultaneously with energization of said welding electrodes.

2. An electric welder comprising
welding electrodes,
electric current supply means,
a weld timer controlling the duration of supply of electric current from said supply means to said electrodes,
an ammeter having a shiftable pointer and responsive to current flow in said supply means,
a clutch normally mechanically locking said pointer against movement, and
clutch actuating means controlled by said weld timer and operable to release and reset said clutch substantially simultaneously with the energization and deenergization, respectively, of said welding electrodes.

3. An electric welding comprising
welding electrodes,
electric current supply means,
a weld timer controlling the duration of supply of electric current from said supply means to said electrodes,
said weld timer including a weld timing relay,
an ammeter having a shiftable pointer,
a clamp normally engaging and locking said pointer stationary, and
electrically actuated clamp releasing means controlled by said relay.

4. An electric welder comprising
welding electrodes,
a source of welding current,
a weld timer including an electric circuit having a relay energized simultaneously with an controlling the supply of current from said source to said electrodes,
an ammeter responsive to current flow to said electrodes and having a moving indicator member,
spring-urged normally operable means for mechanically locking said indicator member stationary, and
lock release means connected to said timer circuit in parallel to said relay.

5. An electric welder comprising
welding electrodes,
a source of welding current,
a weld timer including an electric circuit having a relay energized simultaneously with and controlling the supply of current from said source to said electrodes,
an ammeter responsive to current flow to said electrodes and having a moving indicator member,
a spring-pressed clamp normally mechanically locking said indicator member in stationary position to indicate the preceding current measurement made by said ammeter, and
a solenoid connected to said circuit in parallel to said relay and having a shiftable part connected to said clamp to release the clamp while the solenoid is energized.

6. An electric welder comprising
welding electrodes,
a source of welding current,
a weld timer including an electric circuit having a relay energized simultaneously with and controlling the supply of current from said source to said electrodes,
an ammeter having a moving indicator,
means associated with said current source for supply to said ammeter under the control a said timer of current in selected reduced proportion to the flow of welding current to said electrodes,
a normally operable mechanical clamp for locking said indicator when said ammeter is deenergized, and
means controlled by said weld timer for disengaging said clamp while said ammeter is energized.

7. An electric welder comprising
welding electrodes,
a source of welding current,
a welding timer including an electric circuit having a relay energized simultaneously with and controlling the supply of current from said source to said electrodes
an ammeter having a moving indicator member,
means coupling said ammeter to said current source and including a step-down transformer,
a mechanical clamp for locking said indicator member substantially at the preceding indicating position thereof following each energization of said ammeter, and
means for releasing said clamp while said ammeter is energized.

8. An electric welder comprising
welding electrodes,
a source of welding current,
a weld timer including an electric circuit having a relay energized simultaneously with and controlling the supply of current from said source to said electrodes,
an ammeter having a shiftable pointer member,
means connecting said ammeter to measure flow of current to said electrodes and including a current-limiting shunt,
a mechanical clamp for locking said pointer member at the position assumed thereby during the preceding energization of said ammeter, and
means controlled by said weld timer for releasing said clamp simultaneously with the energization of said ammeter.

References Cited in the file of this patent

UNITED STATES PATENTS

| 1,959,690 | Roth | May 22, 1934 |
| 2,748,380 | Platte et al. | May 29, 1956 |
| 2,848,595 | Van Sciver | Aug. 19, 1958 |
| 2,897,444 | Garscia et al. | July 28, 1959 |
| 3,022,460 | Schneider | Feb. 20, 1962 |

FOREIGN PATENTS

| 312,522 | Great Britain | May 30, 1929 |
| 673,334 | Germany | Mar. 20, 1939 |
| 118,558 | Australia | June 8, 1944 |